(12) United States Patent
Basak et al.

(10) Patent No.: US 9,514,022 B1
(45) Date of Patent: Dec. 6, 2016

(54) MODELING STORAGE SYSTEM PERFORMANCE

(75) Inventors: Jayanta Basak, Bangalore (IN); Kaladhar Voruganti, San Jose, CA (US); Siddhartha Nandi, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 181 days.

(21) Appl. No.: 13/275,607

(22) Filed: Oct. 18, 2011

(51) Int. Cl.
*G06F 11/34* (2006.01)

(52) U.S. Cl.
CPC ................................ *G06F 11/3447* (2013.01)

(58) Field of Classification Search
None
See application file for complete search history.

(56) References Cited

U.S. PATENT DOCUMENTS

| | | | | |
|---|---|---|---|---|
| 7,444,310 | B2* | 10/2008 | Meng et al. | 706/15 |
| 7,533,006 | B2* | 5/2009 | Huddleston et al. | 703/2 |
| 7,640,342 | B1* | 12/2009 | Aharoni et al. | 709/226 |
| 8,467,281 | B1* | 6/2013 | Colon et al. | 369/59.22 |
| 2003/0126103 | A1* | 7/2003 | Chen | G06Q 10/06 706/50 |
| 2003/0176931 | A1* | 9/2003 | Pednault | G06F 17/30539 700/31 |
| 2003/0200075 | A1* | 10/2003 | Meng et al. | 703/22 |
| 2007/0112723 | A1* | 5/2007 | Alvarez | G06F 9/50 |
| 2007/0260563 | A1* | 11/2007 | Fan | G06N 99/005 706/12 |
| 2008/0033991 | A1* | 2/2008 | Basak et al. | 707/104.1 |
| 2008/0109684 | A1* | 5/2008 | Addleman et al. | 714/47 |
| 2012/0123991 | A1* | 5/2012 | Arndt et al. | 706/50 |

OTHER PUBLICATIONS

Wang, M., Au, K., Ailamaki, A., Brockwell, A., Faloutsos, C., Ganger, G.R.; Storage device performance prediction with cart models. In: 12th Annual International Symposium on Modeling, Analysis, and Simulation of Computer and Telecommunication Systems, MASCOTS, USA (2004).*
Vincent A. R. Camara, Approximate Bayesian Confidence Intervals for The Mean of a Gaussian Distribution Versus Bayesian Models, Journal of Modern Applied Statistical Methods, 8 (2), 526-533 (2009).*
M. Birke and H. Dette, Testing Strict Monotonicity in Nonparametric Regression, Mathematical Methods of Statistics, 2007, vol. 16, No. 2, pp. 110-123 (2007).*
Lei Zhang, Guiquan Liu,Xuechen Zhang, and Song Jiang, "Storage Device Performance Prediction with SBCART(Selective Bagging Classification and Regression Tree) Models", 7th IFIP International Conference on Network and Parallel Computing(NPC '10), Zhengzhou, China, Sep. 2010.*
James Kirchner, Data Analysis Toolkit #4: Confidence Intervals, as retrieved from http://web.archive.org/web/20100712070045/http://seismo.berkeley.edu/~kirchner/eps_120/Toolkits/Toolkit_04.pdf on Sep. 26, 2014 for archive date of Jul. 12, 2010, 3 pages.*

(Continued)

*Primary Examiner* — Omar Fernandez Rivas
*Assistant Examiner* — Robert Brock
(74) *Attorney, Agent, or Firm* — Klein, O'Neill & Singh, LLP

(57) ABSTRACT

A system and method for creating an accurate black-box model of a live storage system and for predicting performance of the storage system under a given workload is disclosed. An analytics engine determines a subset of counters that are relevant to performance of the storage system with respect to a particular output (e.g., throughput or latency) from performance data in counters of the storage system. Using the subset of counters, the analytics engine creates a workload signature for the storage system by using a recursive partitioning technique, such as a classification and regression tree. The analytics engine then creates the black-box model of the storage system performance by applying uncertainty measurement techniques, such as a Gaussian process, to the workload signature.

23 Claims, 5 Drawing Sheets

(56) References Cited

OTHER PUBLICATIONS

Authors Unknown, Wikipedia entry: Confidence interval, as retrieved from http://en.wikipedia.org/wiki/Confidence_interval on Sep. 26, 2014, 18 pages.*

Gramacy, R. B. and Lee, H. K. H., "Gaussian Processes and Limiting Linear Models." Gra2005-01, University of California, Santa Cruz, 2005, 8 pages. Obtained from https://users.soe.ucsc.edu/~rbgramacy/papers/gra2005-01.pdf on Apr. 18, 2016.*

Helton et al, Survey of Sampling-Based Methods for Uncertainty and Sensitivity Analysis, SAND2006-2901, Sandia National Laboratories, 2006, 84 pages.*

* cited by examiner

MODELING STORAGE SYSTEM PERFORMANCE

FIELD OF THE INVENTION

At least one embodiment of the present invention pertains to network storage systems, and more particularly to modeling performance of a network storage system.

BACKGROUND

A storage controller is a physical processing device that is used to store and retrieve data on behalf of one or more hosts. A network storage controller can be configured (e.g., by hardware, software, firmware, or any combination thereof) to operate as a storage server that serves one or more clients on a network, to store and manage data in a set of mass storage devices, such as magnetic or optical storage-based disks, tapes, or flash memory. Storage of data in the set of mass storage devices can be implemented as one or more storage volumes defining an overall logical arrangement of disk space.

Some storage servers are designed to service file-level requests from hosts, as is commonly the case with file servers used in a network attached storage (NAS) environment. Other storage servers are designed to service block-level requests from hosts, as with storage servers used in a storage area network (SAN) environment. Still other storage servers are capable of servicing both file-level requests and block-level requests, as is the case with certain storage servers made by NetApp®, Inc. of Sunnyvale, Calif., employing the Data ONTAP® storage operating system.

It is beneficial for a storage administrator to predict performance of a network storage system under a given load. This is particularly relevant to utilizing all of the available storage provided by a storage server. For example, if a storage administrator wants to make more use of a storage server's available storage capacity (e.g., increase the number of read/write operations the storage server handles), it is important in order to meet service level objectives (SLOs) to determine whether the storage server will become saturated (the situation in which read/write requests are received faster than they can be processed). Thus, in planning where to increase or decrease workloads, performance prediction can be important. However, predicting the performance of an operational storage system under changing workload characteristics is difficult.

To predict storage system performance, attempts have been made to model storage system as a "black-box" using either a relative fitness model or a queuing model. In the relative fitness model, the behavior of one storage system is scaled to fit another storage system. For example, the latency in storage system A is scaled to the characteristics of storage system B. Then, by observing certain measurable counters in storage system A, the latency in the storage system B is predicted. The scaling from one storage system to another creates a model that does not take the actual performance of storage system B into consideration and therefore creates prediction of the storage system B that may be inaccurate.

In the queuing model based approach, components of a generic storage system are modeled as a queue (i.e., each component is represented by a pause in the processing flow). The parameters of the model queue are set according to the response time of the components in the storage system for which the model is to be created. To predict the performance of the storage system, a sample workload is processed through the queue of components. However, due to the static nature of the parameters used in creating the queue, the queuing model based approach does not adapt well to changing workload characteristics.

SUMMARY

The techniques introduced here provide for accurate black-box modeling of an operational storage system for predicting performance of the storage system under a given workload. Using the techniques introduced here, the system not only creates an accurate black-box model of the storage system, but creates a workload signature as well, such that one can determine whether there is any change in the workload characteristics based on observing changes in the workload signature. Further, by using the techniques introduced here, any changes to the workload characteristics are automatically reflected in the black-box model, because the black-box model is created using the workload signature.

The techniques introduced here include measuring performance data in counters of the storage system and determining a subset of the counters that are relevant to performance of the storage system with respect to a particular output (e.g., throughput or latency). Using the subset of counters, an analytics engine creates a workload signature for the storage system by using a recursive partitioning technique, such as a classification and regression tree. The analytics engine then creates the black-box model of the storage system performance by applying one or more uncertainty measurement techniques, such as a Gaussian process, to the workload signature.

The analytics engine can use the black-box model to predict future performance of the storage system under a sample workload. According to the techniques introduced here, the workload signature can be updated periodically. Additionally, the accuracy of the prediction can be monitored relative to actual storage system performance, and if the prediction is no longer consistent with actual performance, the analytics engine can reconstruct the black-box model.

Other aspects of the techniques summarized above will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
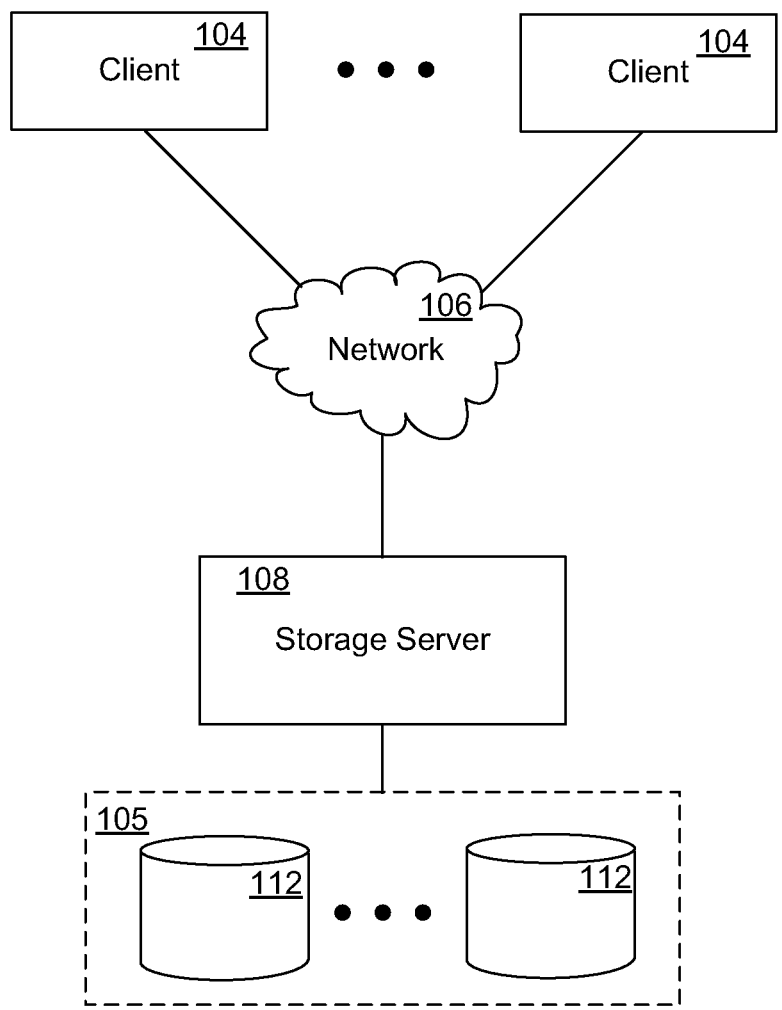
FIG. 1 shows an example of a network storage system.

FIG. 1 shows an example of a network storage system, which includes a plurality of client systems 104, a storage server 108, and a network 106 connecting the client servers 104 and the storage server 108. As shown in FIG. 1, the storage server 108 is coupled with a number of mass storage devices 112, such as disks, in a mass storage subsystem 105. Alternatively, some or all of the mass storage devices 112 can be other types of storage, such as flash memory, solid-state drives (SSDs), tape storage, etc. However, for ease of description, the storage devices 112 are assumed to be disks herein.

The storage server 108 can be, for example, one of the FAS-series of storage server products available from NetApp®, Inc. The client systems 104 are connected to the storage server 108 via the network 106, which can be a packet-switched network, for example, a local area network (LAN) or wide area network (WAN). Further, the storage server 108 can be connected to the disks 112 via a switching fabric (not shown), which can be a fiber distributed data interface (FDDI) network, for example. It is noted that, within the network data storage environment, any other suitable number of storage servers and/or mass storage devices, and/or any other suitable network technologies, may be employed.

The storage server 108 can make some or all of the storage space on the disk(s) 112 available to the client systems 104 in a conventional manner. For example, each of the disks 112 can be implemented as an individual disk, multiple disks (e.g., a RAID group) or any other suitable mass storage device(s). Storage of information in the mass storage subsystem 105 can be implemented as one or more storage volumes that comprise a collection of physical storage disks 112 cooperating to define an overall logical arrangement of volume block number (VBN) space on the volume(s). Each logical volume is generally, although not necessarily, associated with its own file system.

The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used according to the techniques described herein. One or more RAID groups together form an aggregate. An aggregate can contain one or more volumes.

Although the storage controller 108 is illustrated as a single unit in FIG. 1, it can have a distributed architecture. For example, the storage controller 108 can be designed as a physically separate network module (e.g., "N-blade") and disk module (e.g., "D-blade") (not shown), which communicate with each other over a physical interconnect. Such an architecture allows convenient scaling, such as by deploying two or more N-blades and D-blades, all capable of communicating with each other through the interconnect.

Further, a storage controller 108 can be configured to implement one or more virtual storage servers. Virtual storage servers allow the sharing of the underlying physical storage controller resources, e.g. processors and memory, between virtual storage servers while allowing each virtual storage server to run its own operating system (thereby providing functional isolation). With this configuration, multiple server operating systems that previously ran on individual machines, (e.g., to avoid interference) are able to run on the same physical machine because of the functional isolation provided by a virtual storage server implementation. This can be a more cost effective way of providing storage server solutions to multiple customers than providing separate physical server resources for each customer.

Figure 2:
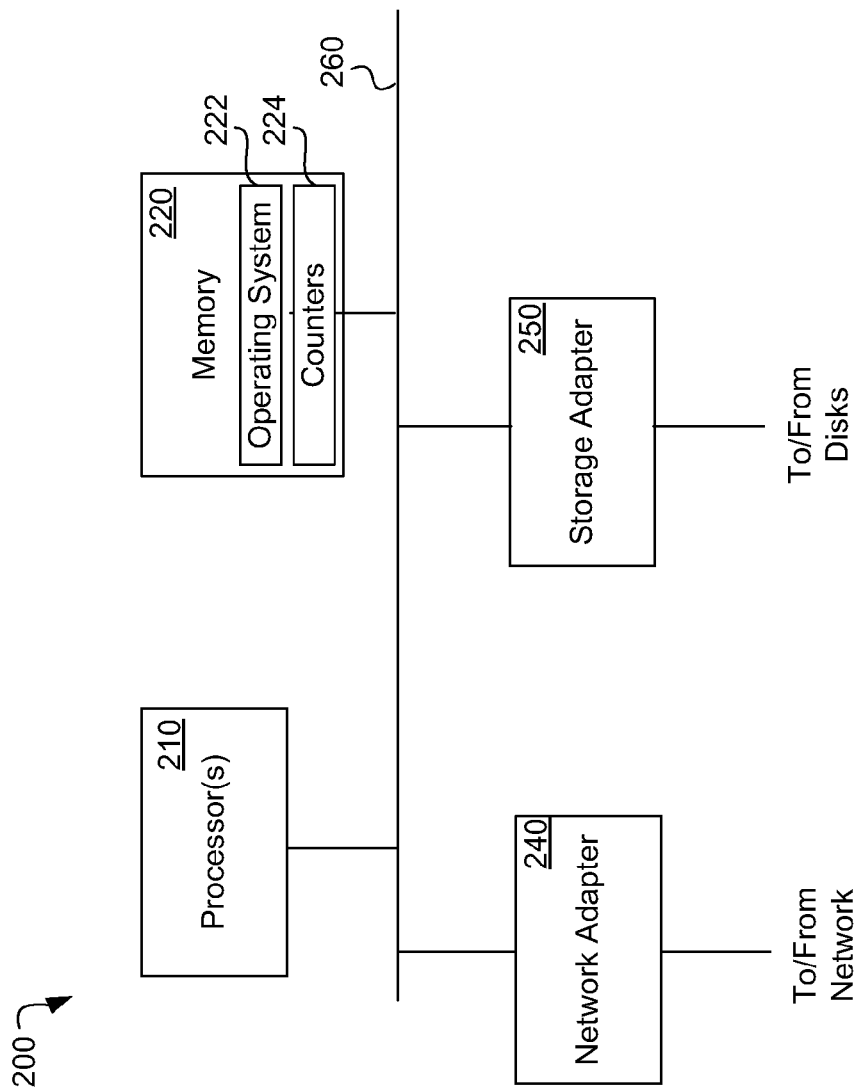
FIG. 2 is a diagram illustrating an example of a storage controller that can implement one or more network storage servers.

FIG. 2 is a diagram illustrating an example of the hardware architecture of a storage controller that can implement one or more network storage servers, for example, storage server 108 of FIG. 1. The storage server is a processing system that provides storage services relating to the organization of information on storage devices, such as disks 112 of the mass storage subsystem 105. In an illustrative embodiment, the storage server 108 includes a processor subsystem 210 that includes one or more processors. The storage server 108 further includes a memory 220, a network adapter 240, and a storage adapter 250, all interconnected by an interconnect 260.

The storage server 108 can be embodied as a single- or multi-processor storage server executing a storage operating system 222 that preferably implements a high-level module, called a storage manager, to logically organize data as a hierarchical structure of named directories, files, and/or data "blocks" on the disks 112.

The memory 220 illustratively comprises storage locations that are addressable by the processor(s) 210 and adapters 240 and 250 for storing software program code and data associated with the techniques introduced here. For example, some of the storage locations of memory 220 can be used as counters 224 that collect data related to performance of the storage system, such as throughput, buffering, read/write operations, etc. The processor 210 and adapters may, in turn, comprise processing elements and/or logic circuitry configured to execute the software code and manipulate the data structures.

The storage operating system 222, portions of which are typically resident in memory and executed by the processing elements, functionally organizes the storage server 108 by (among other things) invoking storage operations in support of the storage service provided by the storage server 108. It will be apparent to those skilled in the art that other processing and memory implementations, including various computer readable storage media, may be used for storing and executing program instructions pertaining to the techniques introduced here. Similar to the storage controller 108, the storage operating system 222 can be distributed, with modules of the storage system running on separate physical resources.

The network adapter 240 includes a plurality of ports to couple the storage server 108 with one or more clients 104, or other storage servers, over point-to-point links, wide area networks, virtual private networks implemented over a public network (Internet) or a shared local area network. The network adapter 240 thus can include the mechanical components as well as the electrical and signaling circuitry needed to connect the storage server 108 to the network 106. Illustratively, the network 106 can be embodied as an Ethernet network or a Fibre Channel network. Each client 104 can communicate with the storage server 108 over the network 106 by exchanging packets or frames of data according to pre-defined protocols, such as Transmission Control Protocol/Internet Protocol (TCP/IP).

The storage adapter 250 cooperates with the storage operating system 222 to access information requested by the clients 104. The information may be stored on any type of attached array of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data and parity information. However, as illustratively described herein, the information is stored on disks 112. The storage adapter 250 includes a plurality of ports having input/output (I/O) interface circuitry that couples with the disks over an I/O interconnect arrangement, such as a conventional high-performance, Fibre Channel link topology.

The storage operating system 222 facilitates clients' access to data stored on the disks 112. In certain embodiments, the storage operating system 222 implements a write-anywhere file system that cooperates with one or more virtualization modules to "virtualize" the storage space provided by disks 112. In certain embodiments, a storage manager 310 (FIG. 3) element of the storage operation system 222 logically organizes the information as a hierarchical structure of named directories and files on the disks 112. Each "on-disk" file may be implemented as a set of disk blocks configured to store information. As used herein, the term "file" means any logical container of data. The virtualization module(s) may allow the storage manager 310 to further logically organize information as a hierarchical structure of blocks on the disks that are exported as named logical units.

Figure 3:
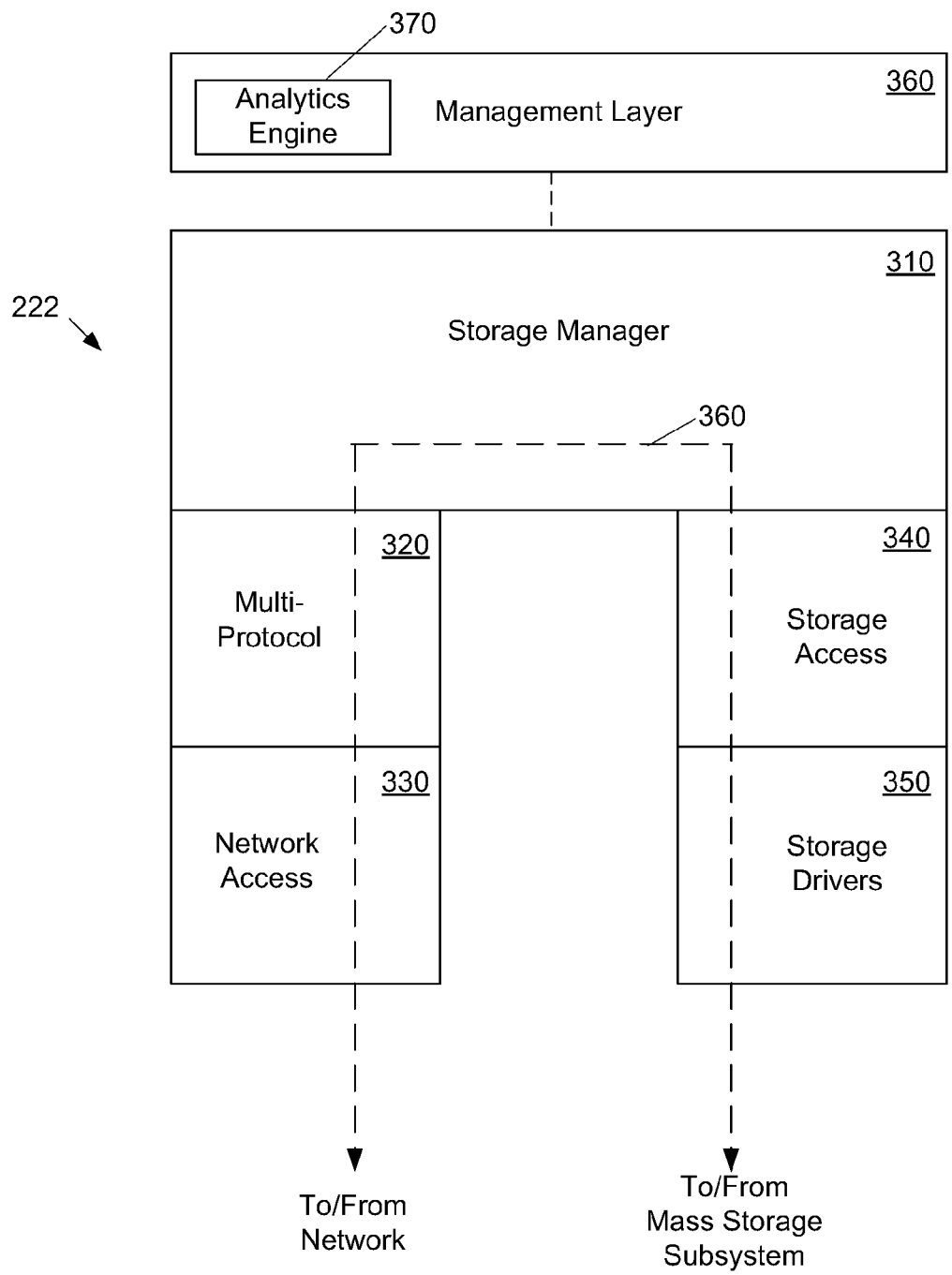
FIG. 3 schematically illustrates an example of the architecture of a storage operating system in a storage server.

FIG. 3 schematically illustrates an example of the architecture of a storage operating system 222 for use in a storage server 108. In one embodiment, the storage operating system 222 can be the NetApp® Data ONTAP™ operating system available from NetApp, Inc., Sunnyvale, Calif. that implements a Write Anywhere File Layout (WAFL™) file system. However, another storage operating system may alternatively be designed or enhanced for use in accordance with the techniques described herein.

The storage operating system 222 can be implemented as programmable circuitry programmed with software and/or firmware, or as specially designed non-programmable circuitry (i.e., hardware), or in a combination thereof. In the illustrated embodiment, the storage operating system 222 includes several modules, or layers. These layers include a storage manager 310, which is the core functional element of the storage operating system 222. The storage manager 310 imposes a structure (e.g., one or more file systems) on the data managed by the storage server 108 and services read and write requests from clients 104.

To allow the storage server to communicate over the network 106 (e.g., with clients 104), the storage operating system 222 also includes a multi-protocol layer 320 and a network access layer 330, logically under the storage manager 310. The multi-protocol layer 320 implements various higher-level network protocols, such as Network File System (NFS), Common Internet File System (CIFS), Hypertext Transfer Protocol (HTTP), and/or Internet small computer system interface (iSCSI), to make data stored on the disks 112 available to users and/or application programs. The network access layer 330 includes one or more network drivers that implement one or more lower-level protocols to communicate over the network, such as Ethernet, Internet Protocol (IP), TCP/IP, Fibre Channel Protocol and/or User Datagram Protocol/Internet Protocol (UDP/IP).

Also, to allow the device to communicate with a storage subsystem (e.g., storage subsystem 105), the storage operating system 222 includes a storage access layer 340 and an associated storage driver layer 350 logically under the storage manager 310. The storage access layer 340 implements a higher-level storage redundancy algorithm, such as RAID-4, RAID-5 or RAID DP®. The storage driver layer 350 implements a lower-level storage device access protocol, such as Fibre Channel Protocol or small computer system interface (SCSI).

Also shown in FIG. 3 is the path 360 of data flow through the storage operating system 222, associated with a read or write operation, from the client interface to the storage interface. Thus, the storage manager 310 accesses the storage subsystem 105 through the storage access layer 340 and the storage driver layer 350. Clients 104 can interact with the storage server 108 in accordance with a client/server model of information delivery. That is, the client 104 requests the services of the storage server 108, and the storage server may return the results of the services requested by the client, by exchanging packets over the network 106. The clients may issue packets including file-based access protocols, such as CIFS or NFS, over TCP/IP when accessing information in the form of files and directories. Alternatively, the clients may issue packets including block-based access protocols, such as iSCSI and SCSI, when accessing information in the form of blocks.

The storage operating system 222 includes a management layer 360 that provides a path for a network administrator to request network management operations, e.g., storage system configuration and SLO management, on the storage system. The management layer also provides analysis of storage system performance to a network administrator. In one embodiment, the management layer includes an analytics engine 370 that analyzes the performance of the storage system and provides reports to the network administrator.

In one embodiment, the management layer can generate a graphical user interface that provides several windows and drop-down menus to a user, (e.g., the storage administrator) to view and manipulate the performance predictions described here. For example, in one window, the response curves (e.g., throughput or latency) for the actual storage system performance and the predicted response curves can be displayed together for comparison purposes. The window can also display a confidence band, as described below, along with the prediction. The display can also show the regions where the actual response was not consistent with the predicted performance.

A second window can provide a history of the workload signature for each response curve. The user can select the response curve from a drop-down menu. In one embodiment, the system will highlight whenever there is a change in the workload signature.

A third window can provide the user with menus to select the learning parameters, e.g., training size (percentage), the time frame over which training will be refreshed, training policy (e.g., regular interval or significant deviation of the prediction).

Figure 4:
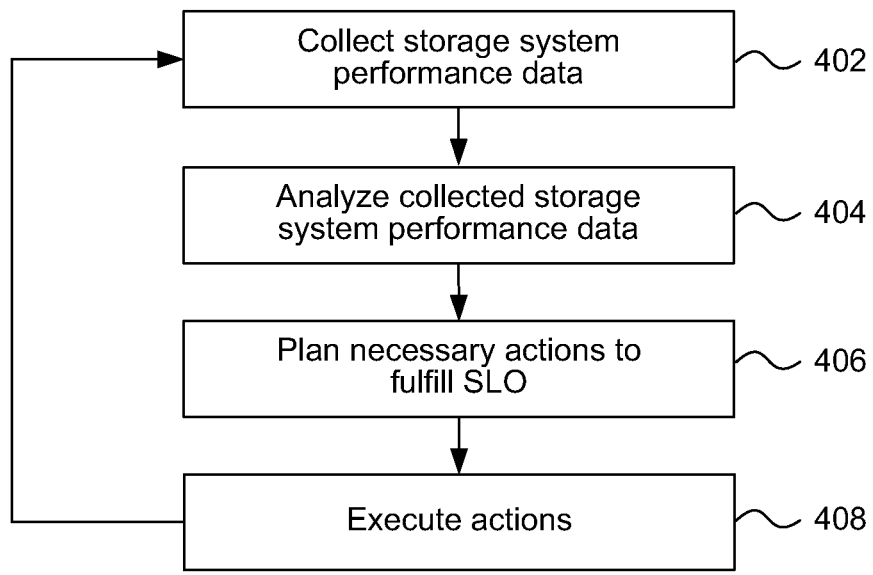
FIG. 4 is a flow diagram of a process for service level objective management.

FIG. 4 is a flow diagram of a process for SLO management. The management layer, among other things, performs SLO management. In one embodiment, the management layer 360 implements a MAPE (Measurement and monitoring, Analysis, Planning, and Execution) control loop to manage the SLO. In the measurement and monitoring stage, at step 402, storage system counters 224 collect storage system performance data, such as read latency, network latency, buffer time, etc. The storage system performance data is useful in determining compliance with SLOs. The storage system performance data that is gathered in the measurement and monitoring stage is then analyzed by the analytics engine 370 during the analysis stage at step 404.

The analysis techniques introduced here include creating a regression model (e.g., a classification and regression tree (CART)) to determine a workload signature of the storage system and then using uncertainty measurement techniques (e.g., Gaussian process model) at each leaf node of the CART to predict the response (e.g., latency or throughput) of the storage system to changing conditions. CART is a decision tree used for pattern classification and function approximation (or regression). The analysis step is described in greater detail below with reference to FIG. 5.

At step 406 the storage system plans what actions, if any, are necessary to fulfill the SLO. In one embodiment, the analytics engine 370 performs the planning step. The planning step can include, for example, incremental provisioning of a workload or workload redistribution in order to meet SLOs. Finally, at step 408, the storage system executes the planned actions. After executing the actions, the process returns to the measurement and monitoring phase where the counters are monitored again to determine whether the SLO is being met, and the process continues as described above.

In one embodiment, the analysis phase of the MAPE control loop is initiated periodically, for example, once per week. Alternatively, the analysis phase of the MAPE control loop can be initiated in response to determining that predicted storage system performance based on a previous analysis is not consistent with actual storage system performance during the monitoring phase or in response to some other specific event. For example, if the predicted latency is not consistent with the actual latency over a period of time, then the analysis phase can be initiated to create a new model.

In one embodiment, the strengths of CART and Gaussian process models are combined to provide an accurate model of storage system performance. For example, one advantage of using CART is that CART segregates different regions of the performance curve (e.g., non-saturated region and close-to-saturation region) automatically. For example, the performance curve is not necessarily linear. Therefore, in order to produce an accurate model, the curve can be broken into piecewise linear sections which segregates different linear regions of the curve. The Gaussian process model additionally provides a confidence band (i.e., how likely actual performance is going to fall within a deviation from the prediction) along with the prediction. In combining the two methods, the techniques introduced here create an accurate model of storage system performance by using the Gaussian process model to perform different forms of regression in each of the different regions of the performance curve generated by CART. This is achieved by using one Gaussian process model at each leaf node of the CART.

Figure 5:
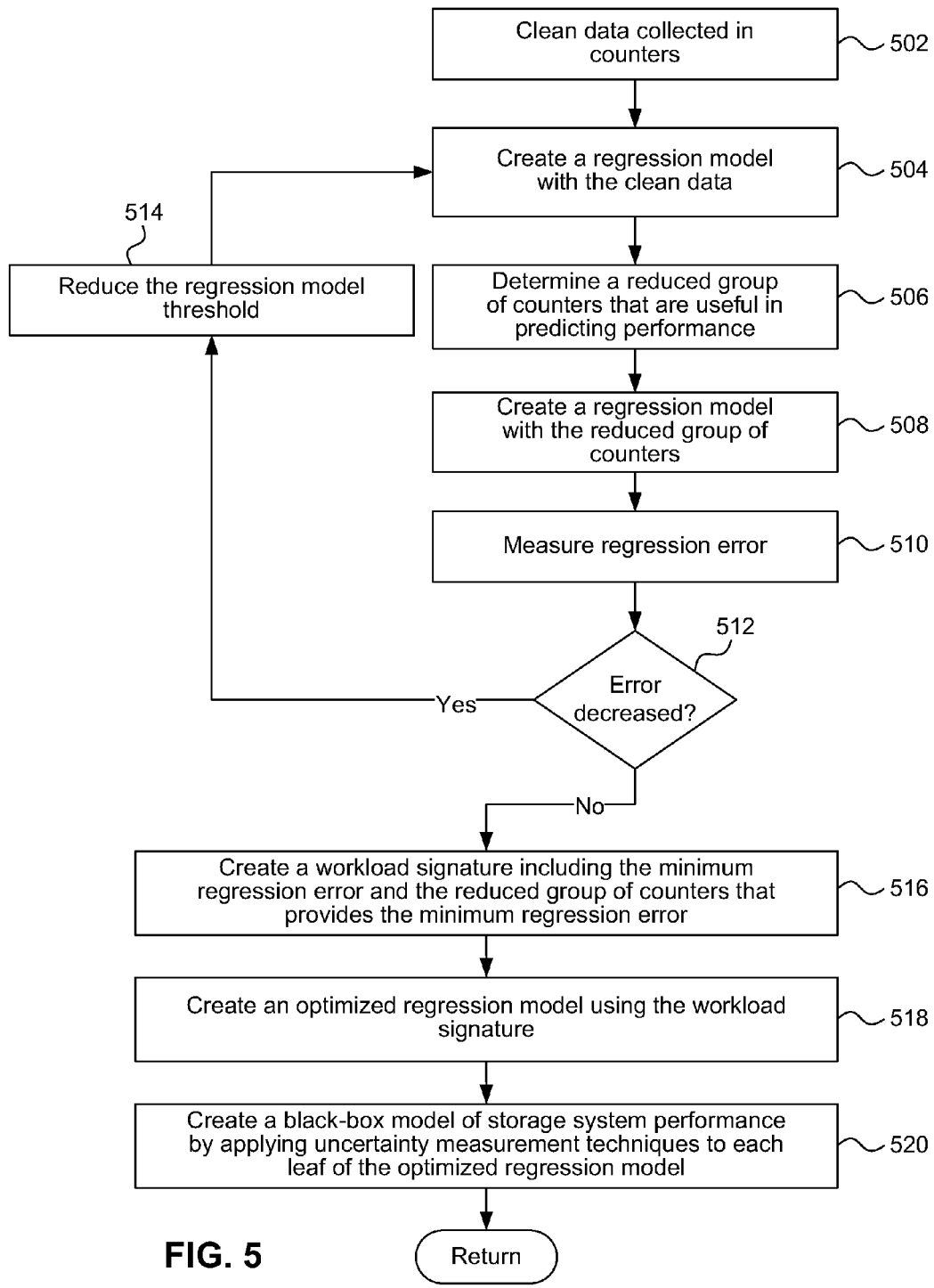
FIG. 5 is a flow diagram of a process for analyzing storage system performance data.

FIG. 5 is a flow diagram of a process for analyzing storage system performance data. Using the techniques introduced here, a black-box model of the storage system is developed during the analysis phase 404 of FIG. 4. The black-box model can be used to predict the response of the storage system in response to changes in the storage system (e.g., adding hardware or increasing the frequency of read/write operations).

The analysis process begins at step 502, where performance data collected in counters during the measuring and monitoring stage is cleaned. Cleaning the performance data prior to creating a model that is based on the performance data leads to a model which can more accurately predict performance of the storage system. In one embodiment, cleaning the performance data includes two steps.

First, an initial data check is performed. This initial data check eliminates all counters that have a zero value. Further, the initial data check eliminates all counters that have a constant value (i.e., there is no variation is measurements over time), since constant values do not contribute to an accurate model.

After the initial data check, the analytics engine 370 processes the remaining counters to determine which counters are monotonic with respect to the SLO output counter. For example, if the model is a latency prediction model, the analytics engine determines which counters are monotonic with respect to latency in the live storage system. In one embodiment, the analytics engine 370 contructs a variogram (a function describing the degree of correlation between two observations) to determine monotonicity of a counter.

In one embodiment of the variogram, let x represent an independent variable (e.g., a counter from the group of counters that passed the initial data check) and y represent the output (e.g., latency). For any pair of observations, $(x_i, y_i)$ and $(x_j, y_j)$, the analytics engine 370 calculates $(d_{ij}, v_{ij})$ where $d_{ij} = |x_i - x_j|$, and $v_{ij} = 0.5*(y_i - y_j)^2$. The analytics engine 370 creates a model variogram, using a cubic polynomial for example. The analytics engine 370 can then measure the deviation of the actual variogram from the model variogram to determine whether the independent variable (i.e., the counter) is monotonic with respect to the output (i.e., latency).

In one embodiment, after all of the counters left from the initial data check have been checked for monotonicity, the counters can be ordered based on the degree of monotonicity (i.e., lower deviation counters appear at the top of the order and the higher deviation counter appears at the bottom of the order). The counters with a large deviation can be eliminated from the group of counters because they are not helpful in creating an accurate model of the storage system performance. For example, in one embodiment, the analytics engine considers a deviation of higher than ten to be a large deviation and those counters with a deviation that are higher than ten are eliminated from consideration. The remaining subset of counters includes the counters to which the recursive partitioning method (i.e., CART) will be applied.

After the clean subset of counters has been determined, the analytics engine 370, at step 504, creates a regression model, for example by applying a CART algorithm to the subset of counters. A CART algorithm applied to a set of data automatically constructs a tree where each leaf node contains a set of samples where a linear surface is fitted to approximate the output. Each leaf corresponds to a counter 224 that the analytics engine 370 has determined to be useful in building a model of the storage system performance with respect to the storage system output. Thus, the CART algorithm constructs a model of the storage system, where each leaf corresponds to a piece in a piecewise linear approximation of the storage system output. Each intermediate node represents a condition such that a sample (e.g., a counter) is placed on one end of the branch depending on the condition. Each leaf is further split into child nodes if the error in the linear surface fit is greater than a chosen threshold value. Therefore, this threshold value determines the depth of the tree (i.e., how many node levels the tree has), effectively serving as the control parameter. For example, if the error is greater the threshold then the data corresponding to that node is split into two child nodes and an error check is run on each. If the error is less than the threshold, the data corresponding to that node is not split and further and the process continues to the next node.

This initial regression is performed with a low threshold value (e.g., on the order of 0.01). Thus, the initial tree is a deep tree with many leaves. To determine whether the reduced group of counters (i.e., the leaves of step 504) are good indicators of performance, a second regression model with a very low threshold value (e.g., on the order of 0.001) is performed on the reduced group of counters at step 508.

At step 510 the analytics engine 370 measures the regression error of the of the second regression model. In one embodiment, the analytics engine generates the regression error of the second regression model by generating training set and test set pairs. A regression tree is constructed for each set in the pair and the error between the test and training data is measured. The regression error is taken as a measure of the overall error in this test data. For example, in one embodiment, the 90th percentile of the errors is taken as the regression error.

At step 512 the analytics engine 370 determines whether the regression error has decreased from the previous iteration. In the case of the first iteration, the error is assumed to have decreased. If the regression error has decreased, at step 514, the analytics engine 370 reduces the regression model threshold and returns to step 504 where the process is repeated. The process repeats until the regression error no longer decreases with an increase of the regression model threshold at step 512.

At step 516, the analytics engine 370 determines the set of counters that provides the minimum regression error. This set of counters and the minimum regression error make up the workload signature for the storage system. At step 518, once the workload signature has been determined, the analytics engine 370 creates an optimized regression model using the workload signature.

At step 520, the analytics engine 370 creates a black-box model of the storage system that can be used to predict performance of the storage system under a given load. The black-box model is created by applying uncertainty measurement techniques, for example, a Gaussian process, to each leaf node of the optimized regression model. A standard Gaussian process can be employed in this step. The Gaussian process not only improves the prediction based on the regression model alone, but also provides a confidence interval indicating the band in which the prediction will lie with a certain confidence.

Because the black-box model is not created by scaling from one storage system to another or creating a model of static components, but is created by using live performance data from an active storage system, if the workload characteristics change then the black-box model automatically captures the changed characteristics. This provides an accurate, nearly real-time, model for predicting performance of the storage system.

The processes described herein are organized as sequences of operations in the flowcharts. However, it should be understood that at least some of the operations associated with these processes potentially can be reordered, supplemented, or substituted for, while still performing the same overall technique.

The techniques introduced above can be implemented by programmable circuitry programmed or configured by software and/or firmware, or they can be implemented entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method performed by a storage system having one or more processors, comprising:

collecting storage system performance data using a plurality of counters;

filtering by an analytics engine of the storage system the collected storage system performance data by eliminating any counter value that is constant over time and any counter that has a zero value, wherein the one or more processors invoke the analytics engine and the filtering generates a first subset of counters with associated performance data that affects performance of the storage system relative to a service level objective;

identifying by the analytics engine which of the first subset of counters are monotonic with respect to a performance parameter that is used for predicting performance of the storage system relative to the service level objective;

selecting by the analytics engine a second subset of counters from the first subset of counters based on a degree of monotonicity where the degree of monotonicity selects lower deviation monotonic counters over higher deviation monotonic counters from among the first subset of counters;

determining by the analytics engine a third subset of counters from the second subset of counters by using an initial regression model with a first threshold value and a second regression model with a second threshold value that is less than the first threshold value to determine whether the third subset of counters are a reliable indicator of performance of the storage system relative to the service level objective;

using by the analytics engine recursive partitioning for iteratively determining regression error of the second regression model for the third subset of counters to identify a fourth subset of counters with minimum regression error;

creating a workload signature of the storage system relative to the service level objective and by using recursive partitioning of performance data associated with the fourth subset of counters and representing a plurality of measures of actual live storage system performance, wherein the workload signature is based on the fourth subset of counters and the minimum regression error associated with the fourth subset of counters;

creating, by the analytics engine, a storage system performance model by using the workload signature and an uncertainty measurement technique, wherein the uncertainty measurement technique applies a Gaussian process model to each leaf node of the recursive partitioning and computes a confidence band indicating a certain confidence level for a likelihood of actual performance to be within a specified deviation from a prediction of storage system performance; and predicting, by the analytics engine, performance of the storage system under a sample load by applying the sample load to the storage system performance model.

2. The method of claim 1, wherein the recursive partitioning comprises a classification and regression tree.

3. The method of claim 1 further comprising:

comparing, by the analytics engine, the predicted performance to actual performance of the live storage system; and in response to determining that the actual performance is not consistent with the predicted performance, repeating the steps of creating a workload signature, creating a storage system performance model, and predicting performance of the live storage system.

4. The method of claim 1, further comprising generating a graphical user interface that depicts the predicted performance of the storage system and the actual performance of the storage system, wherein the graphical interface further provides an indication of one or more regions where the actual performance is not consistent with the predicted performance.

5. The method of claim 1, further comprising generating a graphical user interface that depicts the workload signature of the storage system and one or more past workload signatures of the storage system.

6. The method of claim 1, further comprising:

determining, based on the predicted performance of the storage system, an incremental provisioning of a workload or a workload distribution to meet one or more service level objectives; and implementing the determined incremental provisioning or workload distribution to meet the one or more service level objectives.

7. The method of claim 1, wherein the service level objective is one of latency or throughput.

8. The method of claim 1, wherein the analytics engine constructs a variogram that describes a degree of correlation between two observations to determine the monotonicity of the first subset of counters.

9. A system comprising:

a memory containing machine readable medium comprising machine executable code having stored thereon instructions; and a processor module coupled to the memory executes the machine executable code for an analytics engine to:

collect performance data for a storage system using a plurality of counters;

filter the collected storage system performance data by eliminating any counter value that is constant over time and any counter that has a zero value, wherein the filtering generates a first subset of counters with associated performance data that affects performance of the storage system relative to a service level objective;

identify which of the first subset of counters are monotonic with respect to a performance parameter that is used for predicting performance of the storage system relative to the service level objective;

select a second subset of counters from the first subset of counters based on a degree of monotonicity where the degree of monotonicity selects lower deviation monotonic counters over higher deviation monotonic counters from among the first subset of counters;

determine a third subset of counters from the second subset of counters by using an initial regression model with a first threshold value and a second regression model with a second threshold value that is less than the first threshold value to determine whether the third subset of counters are a reliable indicator of performance of the storage system relative to the service level objective;

use recursive partitioning for iteratively determining regression error of the second regression model for the third subset of counters to identify a fourth subset of counters with minimum regression error;

create a workload signature of the storage system relative to the service level objective and by using recursive partitioning of performance data associated with the fourth subset of counters and representing a plurality of measures of actual live storage system performance, wherein the workload signature is based on the fourth subset of counters and the minimum regression error associated with the fourth subset of counters;

create a storage system performance model by using the workload signature and an uncertainty measurement technique, wherein the uncertainty measurement technique applies a Gaussian process model to each leaf node of the recursive partitioning and computes a confidence band indicating a certain confidence level for a likelihood of actual performance to be within a specified deviation from a prediction of storage system performance; and predict performance of the storage system under a sample load by applying the sample load to the storage system performance model.

10. The system of claim 9, wherein a graphical user interface depicts the predicted performance of the storage system and the actual performance of the storage system and provides an indication of one or more regions where the actual performance is not consistent with the predicted performance.

11. The system of claim 10, wherein the graphical user interface depicts the workload signature of the storage system and one or more past workload signatures of the storage system.

12. The system of claim 9, wherein the analytics engine determines based on the predicted performance of the storage system, an incremental provisioning of a workload or a workload distribution to meet one or more service level objectives; and implements the determined incremental provisioning or workload distribution to meet the one or more service level objectives.

13. The system of claim 9, wherein the service level objective is one of latency or throughput.

14. The system of claim 9, wherein the recursive partitioning comprises a classification and regression tree.

15. The system of claim 9, wherein the analytics engine constructs a variogram that describes a degree of correlation between two observations to determine the monotonicity of the first subset of counters.

16. A non-transitory machine readable storage medium having stored thereon instructions for performing a method, comprising machine executable code which when executed by at least one machine, causes the machine to:

collect performance data for a storage system using a plurality of counters;

filter the collected storage system performance data by eliminating any counter value that is constant over time and any counter that has a zero value, wherein the filtering generates a first subset of counters with associated performance data that affects performance of the storage system relative to a service level objective;

identify which of the first subset of counters are monotonic with respect to a performance parameter that is used for predicting performance of the storage system relative to the service level objective;

select a second subset of counters from the first subset of counters based on a degree of monotonicity where the degree of monotonicity selects lower deviation monotonic counters over higher deviation monotonic counters from among the first subset of counters;

determining a third subset of counters from the second subset of counters by using an initial regression model with a first threshold value and a second regression model with a second threshold value that is less than the first threshold value to determine whether the third subset of counters are a reliable indicator of performance of the storage system relative to the service level objective;

use recursive partitioning for iteratively determining regression error of the second regression model for the third subset of counters to identify a fourth subset of counters with minimum regression error;

create a workload signature of the storage system relative to the service level objective and by using recursive partitioning of performance data associated with the fourth subset of counters and representing a plurality of measures of actual live storage system performance, wherein the workload signature is based on the fourth subset of counters and the minimum regression error associated with the fourth subset of counters;

create a storage system performance model by using the workload signature and an uncertainty measurement technique, wherein the uncertainty measurement technique applies a Gaussian process model to each leaf node of the recursive partitioning and computes a confidence band indicating a certain confidence level for a likelihood of actual performance to be within a specified deviation from a prediction of storage system performance; and predict performance of the storage system under a sample load by applying the sample load to the storage system performance model.

17. The non-transitory storage medium of claim 16, wherein the analytics engine compares the predicted performance to actual performance of the live storage system; and in response to determining that the actual performance is not consistent with the predicted performance, repeating the steps of creating a workload signature, creating a storage system performance model, and predicting performance of the live storage system.

18. The non-transitory storage medium of claim 16, wherein a graphical user interface depicts the predicted performance of the storage system and the actual performance of the storage system and provides an indication of one or more regions where the actual performance is not consistent with the predicted performance.

19. The non-transitory storage medium of claim 18, wherein the graphical user interface depicts the workload signature of the storage system and one or more past workload signatures of the storage system.

20. The non-transitory storage medium of claim 16, wherein the analytics engine determines based on the predicted performance of the storage system, an incremental provisioning of a workload or a workload distribution to meet one or more service level objectives; and implements the determined incremental provisioning or workload distribution to meet the one or more service level objectives.

21. The non-transitory storage medium of claim 16, wherein the service level objective is one of latency or throughput.

22. The non-transitory storage medium of claim 16, wherein the recursive partitioning comprises a classification and regression tree.

23. The non-transitory storage medium of claim 16, wherein a variogram that describes a degree of correlation between two observations is constructed to determine the monotonicity of the first subset of counters.

* * * * *